United States Patent [19]

Hibbert

[11] Patent Number: 5,380,776

[45] Date of Patent: Jan. 10, 1995

[54] MOLDABLE FILLED POLYESTER RESIN COMPOSITION

[75] Inventor: Peter G. Hibbert, Newark, Del.

[73] Assignee: ICI Americas Inc., Wilmington, Del.

[21] Appl. No.: 938,795

[22] Filed: Sep. 1, 1992

[51] Int. Cl.⁶ ............................................. C08K 5/521
[52] U.S. Cl. ................................. 524/145; 524/443; 524/449; 524/513
[58] Field of Search ................ 524/145, 443, 449, 513

[56] References Cited

U.S. PATENT DOCUMENTS

| | | | |
|---|---|---|---|
| 3,475,204 | 10/1969 | Patterson | 524/145 |
| 3,953,539 | 4/1976 | Kawase et al. | 524/145 |
| 4,183,843 | 1/1980 | Koenig et al. | |
| 4,260,538 | 4/1981 | Iseler et al. | |
| 4,282,133 | 8/1981 | Fearing et al. | |
| 4,336,181 | 6/1982 | Iseler et al. | |
| 4,500,634 | 2/1985 | Sakanoue et al. | |
| 4,533,689 | 8/1985 | Tayama et al. | 524/145 |
| 4,535,110 | 8/1985 | Iseler et al. | |
| 4,536,531 | 8/1985 | Ogawa et al. | 524/145 |
| 4,622,354 | 11/1986 | Iseler et al. | |
| 4,704,417 | 11/1987 | Bonin et al. | 524/145 |
| 4,746,462 | 5/1988 | Nakamura et al. | |

FOREIGN PATENT DOCUMENTS 2022957 3/1991 Canada .

*Primary Examiner*—Kriellion S. Morgan
*Attorney, Agent, or Firm*—Paul L. Sharer

[57] ABSTRACT

The present invention is directed to compositions and processes for making moldable filled polyester resin compositions comprising a liquid polyester resin; an inert filler; and a $C_4$-$C_{18}$, alkyl, cycloalkyl, alkenyl or alkynyl phosphate; which resin composition exhibits an unexpectedly low viscosity.

17 Claims, No Drawings

MOLDABLE FILLED POLYESTER RESIN COMPOSITION

FIELD OF THE INVENTION

The present invention is directed to a moldable filled polyester resin composition comprising a liquid polyester resin; an inert filler; and a $C_4$–$C_{18}$, alkyl, cycloalkyl, alkenyl or alkynyl phosphate; which resin composition exhibits an unexpectedly low viscosity. In another embodiment, the present invention is directed to a method of producing such a moldable filled polyester resin composition.

BACKGROUND OF THE INVENTION

The use of filled polyester resins as sheet molding compounds (SMC) and/or as bulk molding compounds (BMC) is well established. In general, it is desirable for such compositions to contain as much filler as possible in order to increase the stiffness as well as to improve the surface quality of the molded products. Unfortunately, the addition of large proportions of filler increases the viscosity of molding compositions thereby leading to processing difficulties, as well as, to difficulties in wetting out reinforcing fibers which may be present and in allowing entrapped air to be released.

In order to overcome the difficulties associated with such increase in viscosity, it has been proposed to add certain viscosity reducing agents to the moldable filled resin composition. In large part, the necessity of adding such an agent stems from the susceptibility of the polyester resins, typically employed, to commence crosslinking upon exposure to heat such that the mere heating of the mixture to lower its viscosity is precluded.

One commercially available additive which has been promoted as a viscosity reducing agent for such compositions is a polymeric material available from Byk-Chemie G.m.b.H. Thus, in Modern Plastics International, October 1986, at page 112, this material is described as being effective for the wetting and dispersion of mineral fillers in hot-curing glass fiber-reinforced unsaturated polyester resin to provide a reduction in impregnation viscosity.

Canadian Patent Application 2,022,957, to Haubennestel et al., discloses that certain phosphoric acid esters which are the reaction product of phosphoric acid with an oxyalkylated monoalcohol containing carboxylic acid ester groups and/or urethane groups can be similarly employed to lower the viscosity of SMC and/or BMC compositions.

While such materials have been found to provide some efficacy in reducing the viscosity of filled moldable polyester compositions, it would nevertheless be desirable to have additives which would yield filled compositions possessing at even lower viscosities.

The present invention provides a moldable filled composition which exhibits an unexpectedly low viscosity and which yields articles exhibiting desirable strength and surface properties.

In one aspect, the present invention is directed to a moldable composition comprising:
(A) a liquid polyester resin;
(B) an inert filler; and
(C) a compound of the formula:

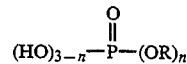

wherein:
R is $C_4$–$C_{18}$ alkyl, $C_4$–$C_{18}$ alkenyl or $C_4$–$C_{18}$ alkynyl; and
n is 1 or 2.

In another aspect, this invention is directed to a process for producing a moldable composition comprising blending (A) a liquid polyester resin; (B) an inert filler; and (C) a compound of the formula

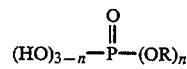

wherein:
R is $C_4$–$C_{18}$ alkyl, $C_4$–$C_{18}$ alkenyl or $C_4$–$C_{18}$ alkynyl; and
n is 1 or 2; in a solids or solid-liquid mixing device until a uniform mixture is obtained.

DETAILED DESCRIPTION OF THE PREFERRED EMBODIMENTS

The moldable composition of this invention is comprised of (A) a liquid polyester resin; (B) a filler; and (C) a $C_4$–$C_{18}$ alkyl, alkenyl or alkynyl phosphate ester.

The liquid polyester resin, Component (A), may be any material suitable for the formation of SMC and/or BMC compositions, which materials are known to those skilled in the art. In general, such resins are produced by the condensation of at least one unsaturated dicarboxylic acid or anhydride with at least one polyol, typically a glycol. Examples of suitable unsaturated dicarboxylic acids which may be employed are alpha, beta-ethylenically unsaturated dicarboxylic acids and their anhydrides such as fumaric acid, maleic acid, and maleic anhydride. Examples of saturated polycarboxylic acids and their anhydrides include phthalic acid, phthalic anhydride, succinic acid, adipic acid and itaconic acid. Other polycarboxylic acids usable herein include citric acid, pyromellitic acid and trimesic acid. The preferred glycols usable herein to make the polyester resin are the alkylene glycols such as ethylene glycol, propylene glycol, neopentyl glycol, butylene glycol, and bisphenol A, all of which are well known in the art. Either the dicarboxylic acids or the glycols may be halogenated to reduce the flammability of molded articles.

The liquid polyester resin may be dispersed or dissolved in reactive monomers such as styrene, vinyl toluene, and the like.

The inert filler, component (B), may be any filler or reinforcing material conventionally incorporated in sheet or bulk molding compositions including inorganic and/or organic particulate fillers, inorganic and/or organic fibrous materials, or mixtures of particulate fillers and/or fibrous materials. Illustrative of such inert filler materials are inorganic fillers selected from the group consisting of silicates, calcium carbonate, mica, barytes, clay, diatomaceous earth, silica, fullers earth, and the like, as well as organic fillers selected from the group consisting of wood flour, cork dust, cotton flock, wool felt, shredded cornstalks, ground nut shells, and the like. Furthermore, for purposes of this invention the term inert filler is meant to include reinforcing materials.

The phosphate ester, Component (C), employed in the molding composition of this invention is of the formula

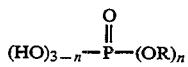

$$(HO)_{3-n}-\overset{\overset{O}{\|}}{P}-(OR)_n$$

wherein R is $C_4$-$C_{18}$ alkyl, $C_4$-$C_{18}$ cycloalkyl, $C_4$-$C_{18}$ alkenyl or $C_4$-$C_{18}$ alkynyl; and wherein n is 1 or 2. Preferably n is 1 and R is $C_4$-$C_{18}$ alkyl. More preferably, the viscosity reducing compound is selected from the group consisting of hexyl phosphate, decyl phosphate, and stearyl phosphate.

The amount of phosphate ester present in the composition may be any amount which is effective to reduce the viscosity of the composition to the desired level—i.e., a viscosity reducing effective amount. For most applications this amount is typically in the range of between about 0.05 to about 10 parts, preferably in the range of from about 0.25 to about 5 parts, and most preferably in the range of from about 0.5 to about 2.0 parts per 100 parts of inert filler, the parts being by weight.

The amount of inert filler or fillers present in the composition may be as low as about 20 percent by weight. When used alone without reinforcing fiber, the filler may be employed in an amount as high as about 80 percent by weight. The inert fillers are preferably employed in the range of between 25 and about 50 percent by weight based on the total weight of components (A), (B) and (C).

Where necessary to initiate cross-linking of the liquid polyester, the composition of this invention may also include therein a catalyst which is typically a free-radical initiator. Any effective catalyst or catalyst composition may be employed. Illustrative of the free radical generating polymerization catalysts which may be employed are lauroyl peroxide, benzoyl peroxide, para-chlorobenzoyl peroxide, and 2,4-dichlorobenzoyl peroxide, ketone peroxides such as methyl ethyl ketone peroxide, cyclohexanone peroxide, methyl isobutyl ketone peroxide, and others including dicumyl peroxide, 2,2'-bis(4,4'-ditertiary butyl peroxy cyclohexyl propane), ditertiary butyl peroxide, cumene hydroperoxide, tertiary butyl cumyl peroxide, tertiary butyl perbenzoate, and the like.

In addition to the foregoing, the moldable compositions of this invention may further include other additives which are conventionally employed in sheet molding and bulk molding compositions such as mold release agents, low profile additives, and the like. Such additional additives are well known to those in the molding industry.

The moldable compositions of this invention are produced by blending the liquid polyester resin, the inert filler, and the phosphate ester viscosity reducing compound in a solids or solid/liquid mixing device until a uniform mixture is obtained. Such components may be blended in any order, but typically the liquid polyester is first blended with the phosphate ester viscosity reducing compound with the filler being introduced thereafter.

The moldable compositions of this invention exhibit an unexpectedly low viscosity and are thus more easily processed than are conventional sheet molding or bulk molding compositions. An added advantage of such lower viscosity is that air entrained in the composition during the mixing process can be more easily released which permits the molded product to exhibit desirable surface characteristics.

Alternatively, the compositions of this invention can be formulated with increased amounts of filler and yet, due to the low viscosity, can be processed in the same manner as conventional molding compositions.

EXAMPLES

The following Examples are intended to further illustrate the present invention and are not intended to limit the scope of the invention in any manner whatsoever.

In the examples, the following materials and test procedures were utilized:

Stypol 40-3942 refers to an orthophthalic acid based thermoset polyester resin in styrene, commercially available from Freeman Chemicals D.S.M.

Neulon T refers to 42% solids PVAC in styrene, commercially available from Union Carbide.

Hubercarb Q6 refers to calcium carbonate, commercially available from J.M. Huber, Co.

Byk-995 refers to a phosphated combination polycaprolactone and polyethylene glycol, commercially available from Byk-Chemie G.M.B.H.

Commercial Polymeric refers to a phosphated polycaprolactone.

G-2199 refers to a phosphate ester composition derived by phosphating straight chain hexyl alcohol, commercially available from ICI Americas Inc.

Viscosity Measurements were carried out using a Haake RV 20 Rotoviscometer fitted with a PK 100 cone and plate attachment and a M5 head.

Control A and Control B, which contain no viscosity reducing compound, are formulations run concurrently with the respective Examples in each Table. As will be known by those of ordinary skill in the art the differences in the results of these controls is both a function of the variation in the ambient conditions at the time of the test and the accuracy of the viscosity measurements in the high viscosity range.

EXAMPLE 1-2 AND COMPARATIVE EXPERIMENTS

The following standard procedure was used. To 52 grams of Stypol 40-6020[1] and 10 grams of styrene were added 1.50 grams of the viscosity reducing compound indicated in Table 1, below. The resultant mixture was stirred on a Tekmar mixer fitted with a toothed disc type impeller. Next, 38 grams of the low profile agent Neulon T were added followed by 200 grams of Hubercarb Q6 which was added incrementally over approximately a two minute period. The stirrer speed was gradually increased throughout the addition and was 1200 r.p.m. at the end of the addition. The entire mixture was then stirred at 1200 r.p.m. for two minutes and allowed to stand overnight at room temperature before the viscosity measurements were taken.

This procedure was run using no viscosity reducing compound (Comparative A); Byk-995, (Comparative A-1 and B-1), Commercial Polymeric, (Comparative A-2 and B-2) and G-2199, a phosphate ester of the present invention (Examples 1 and 2). The results are indicated in Table 1 below.

TABLE 1

| Comparative # or Example # | Viscosity Reducing Compound | Weight in grams | Viscosity at 30 sec$^{-1}$ (cps) |
|---|---|---|---|
| Comp. A | no additive | 0.0 | 47,000 |
| Comp. A-1 | Byk 995 | 1.50 | 36,000 |
| Comp. A-2 | Commercial Polymeric | 1.50 | 26,000 |
| Example 1 | Hexyl phosphate | 1.50 | 20,000 |
| Comp. B-1 | Byk 995 | 2.50 | 23,000 |
| Comp. B-2 | Commercial Polymeric | 2.50 | 21,000 |
| Example 2 | Hexyl phosphate | 2.50 | 20,000 |

EXAMPLE 3-5

Employing a procedure identical to that of Example 1, four other moldable compositions were prepared differing only in the viscosity reducing compound employed. Example 3 contained hexyl phosphate, Example 4 contained decyl phosphate and Example 5 contained stearyl phosphate. The following is a list of the components present in the moldable composition:

| Component | Weight |
|---|---|
| Stypol 40-3942 | 26 grams |
| Styrene | 5 grams |
| Neulon T | 19 grams |
| Hubercarb Q6 | 100 grams |
| Zinc stearate, mold release additive | 1.75 grams |
| viscosity reducing compound | 1.00 grams |

The viscosity of these molding composition were then tested at a range of shear rates and the results are indicated in Table 2 below.

TABLE 2

| | VISCOSITY (poise) | | | | |
|---|---|---|---|---|---|
| | Shear Rate (sec$^{-1}$) | | | | |
| Example # | 10 | 20 | 30 | 40 | 50 |
| Control A | 67 | 53 | 47 | 41 | 39 |
| Example 3 | 56 | 34 | 29 | 25 | 24 |
| Example 4 | 44 | 30 | 28 | 27 | 26 |
| Example 5 | 47 | 30 | 28 | 24 | 23 |

EXAMPLE 6-9

Viscosity test results were run on four other compositions identical to those of Examples 3-5, above, except that the type and/or amount of the viscosity reducing compound present in the formulation was altered. The results are summarized in Table 3, below. The viscosity reducing compounds employed in Examples 6-9 are as follows:

TABLE 3

| | VISCOSITY (poise) | | | | |
|---|---|---|---|---|---|
| | Shear Rate (sec$^{-1}$) | | | | |
| Example # | 10 | 20 | 30 | 40 | 50 |
| Control B | 105 | 81 | 66 | 59 | 53 |
| Example 6 | 50 | 28 | 23 | 20 | 19 |
| Example 7 | 49 | 30 | 26 | 22 | 18 |
| Example 8 | 36 | 26 | 16 | 11 | 9 |
| Example 9 | 41 | 18 | 13 | 11 | 9 |

Example 6 - 1 gram of G-2199.
Example 7 - 1 gram of a phosphate ester derived from a branched hexyl alcohol.
Example 8 - 2 grams of G-2199.
Example 9 - 2 grams of the same compound used in Example 7.

What is claimed is:

1. A moldable composition comprising;
   (A) a liquid polyester resin produced by the condensation reaction of at least one unsaturated dicarboxylic acid or anhydride with at least one polyol;
   (B) an inert filler; and
   (C) a viscosity reducing effective amount of a compound of the formula:

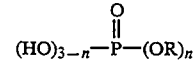

$$(HO)_{3-n}-\overset{\overset{\displaystyle O}{\|}}{P}-(OR)_n$$

wherein:
R is $C_4$-$C_{18}$ alkyl, $C_4$-$C_{18}$ alkenyl or $C_4$-$C_{18}$ alkynyl; and
n is 1 or 2.

2. The moldable composition of claim 1 wherein the compound of component (C) is present in a range between 0.05 to 10 parts per 100 parts of inert filler, the parts being by weight.

3. The moldable composition of claim 1 wherein R is $C_4$-$C_{18}$ alkyl.

4. The moldable composition of claim 1 wherein the compound of component (C) is selected from the group consisting of hexyl phosphate, dodecyl phosphate and stearyl phosphate.

5. The moldable composition of claim 1 wherein n is 1.

6. The moldable composition of claim 5, wherein R is $C_4$-$C_{18}$ alkyl.

7. The moldable composition of claim 1 wherein the compound of component (C) is hexyl phosphate.

8. The moldable composition of claim 6 wherein the compound of component (C) is present in a range between 0.50 to 1.0 parts per 100 parts of inert filler, the parts being by weight.

9. The moldable composition of claim 1 wherein the inert filler is present in the range between 20% to 80% by weight of the total weight of components (A), (B) and (C).

10. The moldable composition of claim 1 wherein the composition further comprises component (D) a free-radical initiator.

11. The moldable composition of claim 1 wherein the inert filler is an inorganic and/or organic particulate filler, an inorganic and/or organic fibrous material, or a mixture of particulate fillers and/or fibrous materials.

12. A moldable composition comprising;
    (A) a liquid polyester resin produced by the condensation reaction of at least one unsaturated dicarboxylic acid or anhydride with at least one polyol;
    (B) an inert filler which is an inorganic filler selected from the group consisting of silicates, calcium carbonate, mica, barytes, clay, diatomaceous earth, silica, and fullers earth; and
    (C) 0.4 to 5.0 parts per 100 parts of inert filler, the parts being by weight, of a compound selected from the group consisting of hexyl phosphate, decyl phosphate, and stearyl phosphate.

13. The moldable composition of claim 12 wherein the liquid polyester resin is dispersed or dissolved in a reactive monomer.

14. The moldable composition of claim 12 wherein a viscosity reducing effective amount of the compound of component (C) is present.

15. A process for producing a moldable composition comprising blending (A) a liquid polyester resin produced by the condensation reaction of at least one unsaturated dicarboxylic acid or anhydride with at least one polyol; (B) an inert filler; and (C) between 0.30 to 10.0 parts per 100 parts of inert filler, the parts being by weight, of a compound of the formula:

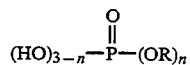

wherein:

R is $C_4$–$C_{18}$ alkyl, $C_4$–$C_{18}$ alkenyl or $C_4$–$C_{18}$ alkynyl; and n is 1 or 2; in a solids or solid-liquid mixing device until a uniform mixture is obtained.

16. The process of claim 15 wherein the liquid polyester resin is first blended with the viscosity reducing compound and the inert filler is introduced thereafter.

17. The process of claim 15 wherein the inert filler is added incrementally over a time period.

* * * * *